Dec. 7, 1926.
H. R. RUSSELL
1,610,161
ROTARY HOE OR CHOPPER
Filed Nov. 5, 1925
2 Sheets-Sheet 1
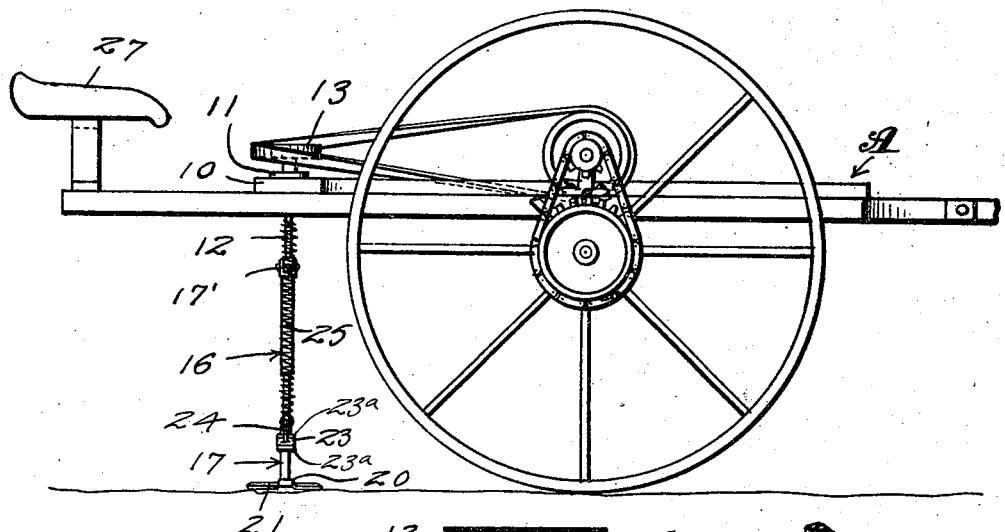
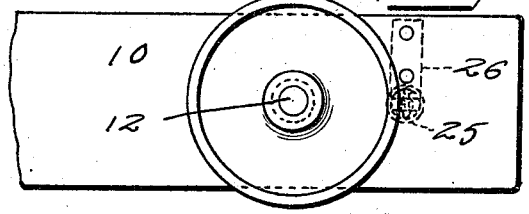
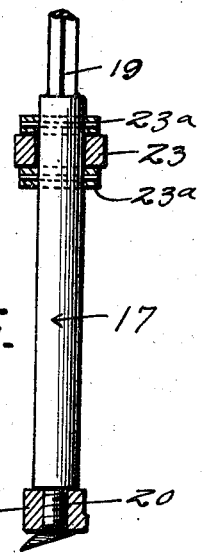
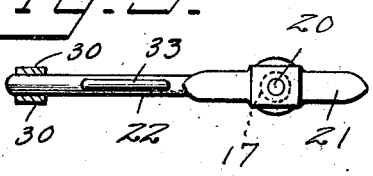
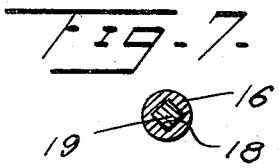
Inventor
H. R. Russell

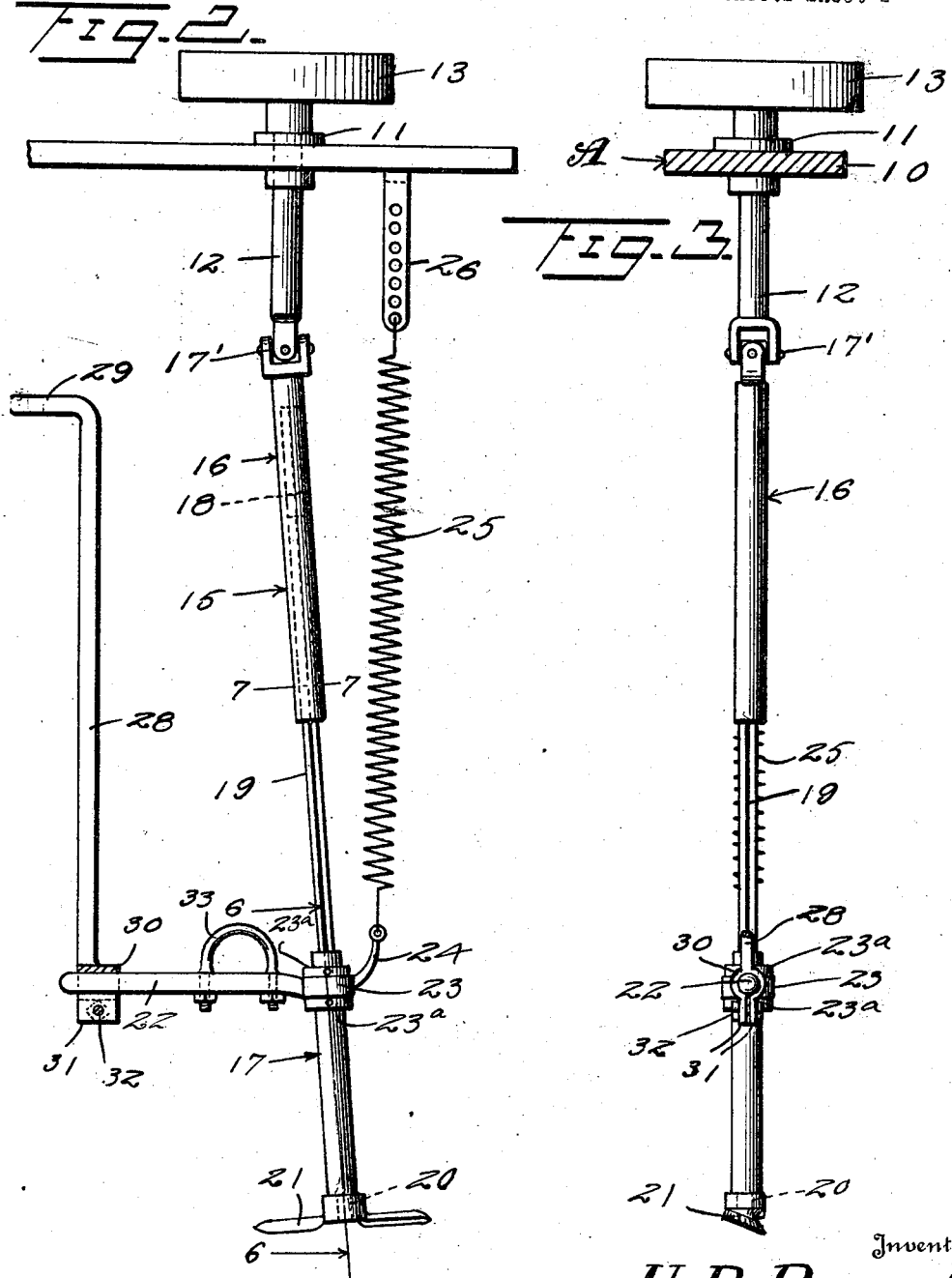

Patented Dec. 7, 1926.

1,610,161

UNITED STATES PATENT OFFICE.

HOMER R. RUSSELL, OF BROWNSVILLE, TEXAS.

ROTARY HOE OR CHOPPER.

Application filed November 5, 1925. Serial No. 67,043.

This invention relates to a rotary hoe, chopper or similar implement adapted for operation by animal or motive power and for instance to cut grass and weeds simultaneously with cultivation, for instance in connection with the chopping of cotton or the hoeing of any row crop.

The more specific objects and advantages will become apparent from a consideration of the description following taken in connection with accompanying drawings illustrating an operative embodiment.

In said drawings:—

Figure 1 is a view in elevation showing the device as attached to a horse-drawn cultivator;

Figure 2 is an elevation of the device alone on an enlarged scale;

Figure 3 is an elevation at a right angle to Figure 2;

Figure 4 is a plan view;

Figure 5 is an inverted plan view;

Figure 6 is a longitudinal sectional view taken on the line 6—6 of Figure 2, and Figure 7 is a detail cross sectional view taken on the line 7—7 of Figure 2.

In carrying out the invention, the same is shown as attached to a horse drawn cultivator as conventionally shown at A but it is to be understood that the device may be carried by any implement desired, for instance a small garden tractor, and be operated by a motor or in any desired manner.

Attached to the frame of the cultivator A is an attaching plate 10, the latter being bolted or in any other preferred way attached to the former. Plate 10 has a bearing at 11 in which a countershaft is vertically disposed and journaled. Such shaft has a pulley 13 keyed thereto and located above the plate 10. A belt 14 may be trained over the pulley 13 and driven in any suitable manner by one of the wheels or moving parts of the cultivator A. At the same time, the drive member 13 is to be taken as conventional since it may not only be the pulley illustrated but on the other hand may be a gear wheel, sprocket wheel or otherwise.

The device embodies a tool staff as at 15 and which may be made in two sections 16 and 17. The former is connected with shaft 12 by a conventional universal joint as at 17 and is longitudinally hollow as at 18. The hollow is square or otherwise non-circular in cross section and is slidably and telescopically fitted by a square rod or extension 19 of the section 17. The lower end of section 17 has a reduced screw threaded shank 20 onto which a chopper, knife or similar tool 21 is removably screwed, such knife being preferably slightly dipped on the cutting side so that the same may more effectively cut into the soil. With each implement, preferably a plurality of knives are adapted for selective use, differing in size.

Section 17 is guided by a handle 22 having a bearing 23 through which said section 17 loosely passes. Handle 22 is incapable of longitudinal movement independently of section 17 by reason of stop collars 23ª thereon. Extending from sleeve 23 is a lug 24 to which a contractile coil spring 25 is fastened at one end and the other end of which is detachably connected to a depending lug 26 on the attaching plate at 10.

For convenience of operation of the handle 22, by the operator seated on the seat 27, a handle 28 is provided that has its upper end L-shaped as shown at 29, while its other end is bifurcated and formed with two semi-cylindrical portions 30 and extended ears 31 to receive a clamping bolt 32. A U-shaped member 33 is also provided secured to handle 22 to enable adjustment of the cutting mechanism by the operator's foot.

In use, with motion imparted to the wheel 13, countershaft 12 is rotated which in turn rotates shaft section 16 and shaft section 17, thus rotating the knife 21 and causing the same to cut the grass and weeds out of a row at the same time the machine 10 cultivates or performs its usual function. The device is primarily adapted for chopping cotton or hoeing any row crop. The tool 21 is kept applied to its work by the operator who engages the handle 22, thus being free to swing the staff 15 from the universal joint 17 and also to lengthen or shorten the staff by reason of the telescopic engagement at portion 19 and socket 18. The staff may thus be moved in practically any direction to best adapt it to its work.

I claim as my invention:—

1. A rotary hoe or chopper, comprising a plate, a countershaft journaled in the plate and adapted for connection to a source of power, a telescopic staff carrying a tool, said staff having universal joint connection with said shaft, a guide handle revolubly mounted on the extensible portion of said staff, and a contractile spring connecting said handle and the plate and tending to shorten said staff.

2. An implement of the class described comprising an attaching plate, a countershaft journaled thereon, a staff flexibly connected to said shaft and carrying a tool, said staff being in telescopic relatively non-rotatable sections, a handle having a bearing on the movable staff section, means to prevent movement of said bearing relatively to said staff section, a lug extending from the bearing, and a contractile spring connected to said lug and to said plate.

In testimony whereof I affix my signature.

HOMER R. RUSSELL.